United States Patent
Hammerschmidt et al.

(10) Patent No.: US 8,067,131 B2
(45) Date of Patent: *Nov. 29, 2011

(54) CONTACT DEVICE AND FUEL CELL STACK OR FUEL CELL BLOCK COMPRISING ONE SUCH CONTACT DEVICE

(75) Inventors: Albert Hammerschmidt, Erlangen (DE); Herbert Hartnack, Erlangen (DE); Arno Mattejat, Erlangen (DE); Igor Mehltretter, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 1126 days.

This patent is subject to a terminal disclaimer.

(21) Appl. No.: 10/558,171

(22) PCT Filed: Apr. 13, 2004

(86) PCT No.: PCT/EP2004/003869
§ 371 (c)(1),
(2), (4) Date: Nov. 9, 2006

(87) PCT Pub. No.: WO2004/107474
PCT Pub. Date: Dec. 9, 2004

(65) Prior Publication Data
US 2007/0054163 A1 Mar. 8, 2007

(30) Foreign Application Priority Data
May 26, 2003 (DE) .................................. 103 23 881

(51) Int. Cl.
*H01M 8/24* (2006.01)

(52) U.S. Cl. .......................... 429/517; 429/518; 429/471

(58) Field of Classification Search .................. 429/517, 429/471, 518
See application file for complete search history.

(56) References Cited

U.S. PATENT DOCUMENTS

| | | | | |
|---|---|---|---|---|
| 4,938,833 A * | 7/1990 | Kaufman et al. | .......... | 156/309.6 |
| 6,001,502 A | 12/1999 | Walsh | | |
| 6,426,161 B1 * | 7/2002 | Cisar et al. | ...................... | 429/38 |
| 6,440,594 B1 | 8/2002 | Kindler et al. | | |
| 7,235,315 B2 * | 6/2007 | Knights et al. | .................... | 429/7 |
| 2001/0026884 A1 | 10/2001 | Appleby et al. | | |
| 2005/0026025 A1 * | 2/2005 | Shah et al. | ....................... | 429/35 |

FOREIGN PATENT DOCUMENTS

| | | |
|---|---|---|
| DE | 37 79 615 T2 | 8/1988 |
| DE | 694 29 304 T2 | 12/1994 |

(Continued)

OTHER PUBLICATIONS

Wang M. et al., "Study on impregnation of polytetrafluoroethylene in graphite for use as fuel cell collector", International Journal of Hydrogen Energy, Elsevier Science Publishers B.V., Barking, GB, vol. 30, No. 9, Aug. 2005, pp. 1027-1030, XP004891587.

Wang Minchua et al., "Study of impregnating polytetrafluoroethylene in graphite for using as collector of fuel cell", Journal of the Chinese Ceramic Society Chinese Ceramic Society China, vol. 30, Oct. 2002, pp. 120-123, XP008052907.

(Continued)

*Primary Examiner* — Jane Rhee

(57) ABSTRACT

The invention relates to a contact device which is arranged in a terminal compartment of a fuel cell stack and is used to electrically contact the fuel cell stack. According to the invention, the surface of said contact device is at least partially provided with a hydrophobic surface layer, facilitating the removal of water, e.g., condensation water, from the terminal compartment and thus from the fuel cell stack.

21 Claims, 2 Drawing Sheets

FOREIGN PATENT DOCUMENTS

| | | |
|---|---|---|
| EP | 0 279 072 A1 | 8/1988 |
| EP | 0 629 015 A1 | 12/1994 |
| EP | 1 070 361 B1 | 1/2001 |
| EP | 1 117 142 A1 | 7/2001 |
| EP | 1 154 505 A1 | 11/2001 |

OTHER PUBLICATIONS

Database Inspec, "Study of impregnating polytetrafluoroethylene in graphite for using as collector of fuel cell", The Institution of Electrical Engineers, Stevenage, GB, 2002, XP002344376.

* cited by examiner

US 8,067,131 B2

CONTACT DEVICE AND FUEL CELL STACK OR FUEL CELL BLOCK COMPRISING ONE SUCH CONTACT DEVICE

CROSS REFERENCE TO RELATED APPLICATIONS

This application is the US National Stage of International Application No. PCT/EP2004/003869, filed Apr. 13, 2004 and claims the benefit thereof. The International Application claims the benefits of German application No. 10323881.6, filed May 26, 2003, both applications are incorporated by reference herein in their entirety.

FIELD OF INVENTION

The invention relates to a contact device used for electrically contacting a fuel cell stack and also a fuel cell stack or a fuel cell block comprising one such contact device.

SUMMARY OF THE INVENTION

Fuel cells are increasingly gaining in importance in forward looking concepts for the generation of energy. In particular, low temperature fuel cells based on polymer electrolyte membrane (PEM) technology are under discussion as an environmentally friendly and efficient energy converter for portable, mobile and stationary use and are already finding initial commercial applications. At temperatures between a little above freezing point and about 90° C. they convert hydrogen and oxygen into electrical direct current, the only byproduct here being water. In this situation, a plurality of fuel cells is usually connected in series in the form of a fuel cell stack.

The water produced occurs predominantly in liquid form at the operating temperatures and must be removed from the fuel cells in an appropriate manner. This is usually done by way of terminal plates at the ends of the fuel cell stack. To this end, the water is guided longitudinally through the fuel cell stack.

Suitable components with a through-flow of deionized water are used in the fuel cell stacks in order to remove the heat losses produced during current generation in the fuel cells The supply and removal of the cooling water passing through the stack usually also takes place by way of the terminal plates at the ends of the stack.

To this end, the deionized water is guided longitudinally through the stack.

In the vicinity of the terminal plates at each end of the fuel cell stack in a terminal compartment is situated a contact device which electrically contacts the fuel cell stack and conducts the current out of the fuel cell stack by way of terminal lugs. The contact device consists for example of a contact plate which is in electrical contact with a pole plate or bipolar plate that terminates the fuel cell stack and may comprise retaining elements, consisting of an elastomer for example, with which the plate is held and/or aligned against the fuel cell stack. In order to improve the electrical connection between the contact plate and the pole plate or bipolar plate the contact device can comprise further components such as contact spring plates or contact membranes, for example. All these components should conduct the current as well as possible and therefore generally consist of a material which is a good electrical conductor, for example copper or a copper alloy.

When these components are assembled, it should be expected on principle that they will become wet and also that the terminal compartment in which they are installed, which is actually free of fuel gas, will not remain dry. A further complication presents itself in that the atmosphere in which the components are installed changes its water vapor content over the course of time. In the event of changes in temperature this can actually result in the moisture condensing out on the components.

In order to avoid accumulations of water in the terminal compartment of the contact device it is necessary for a continuous, at least regular drying of the atmosphere to take place within the scope of service measures carried out on the fuel cell stacks. The drying can for example be performed by flushing the compartment with dry gases such as nitrogen or by applying a vacuum. These methods are however time-consuming and expensive.

The object of the invention is therefore to set down a contact device which facilitates the removal of water from the terminal compartment.

This object is achieved by the claims. Advantageous embodiments of the invention form the subject matter of the respective dependent claims.

The invention is based on the consideration that the surface of the contact device has pores. These pores have hydrophilic properties particularly in the case of metallic surfaces. Water on the surface of the contact device is thus literally sucked into pores just like into a capillary.

These pores are "closed" as a result of the hydrophobic (water-repellent) surface layer provided on the surface of the contact device. The smaller a pore, the greater are the forces that need to be applied in order to press the liquid into the pore. Even a drop of condensed water which forms in the pore will migrate out of the pore as it becomes larger. When droplet formation occurs the water thus remains on the surface of the contact device. The water droplets exhibit only a very low adhesion on this surface and can be removed from there by means of a very small gas flow. By this means, the removal of the water from the terminal compartment can be implemented in a considerably simplified and more cost-effective manner.

If the contact device comprises retaining elements, in particular consisting of an elastomer, in order to hold and/or align the contact device against a fuel cell stack, the process of removing the water can thereby be further simplified in that these retaining elements are likewise provided at least partially with the hydrophobic surface layer.

A good current conducting capability of the contact device and at the same time efficient removal of the water from the terminal compartment are made possible by the fact that the thickness of the hydrophobic surface layer in the area of electrical contact points, for example between the contact device and a pole plate or bipolar plate abutting it, is set to an optimum between a low electrical contact resistance and a high hydrophobicity.

In an advantageous embodiment of the invention the hydrophobic surface layer contains polytetrafluoroethylene (PTFE). This material is characterized by good adhesion on metal or elastomer layers. At the electrical contact points the surface layer advantageously consists of a PTFE/metal or PTFE/carbon mixture in order to achieve a low electrical contact resistance.

In a particularly advantageous embodiment the hydrophobic surface layer consists of a hydrophobing material which is soluble in a solvent. This material can, when in solution, be applied to the surface of the contact device, thereby allowing extremely thin layers to be achieved. By this means it is possible to guarantee on the one hand the hydrophobicity of the surface of the contact device required for simple water removal, while on the other hand also guaranteeing a low contact resistance at the electrical contact points. The contact device can thus be given a good current conducting capability which cannot be achieved, for example, by using pure PTFE coatings. The hydrophobic surface layer consisting of the hydrophobing material which is soluble in a solvent is therefore particularly suitable for electrical connection points.

By preference, the soluble hydrophobing material consists entirely or partially of an amorphous fluoropolymer; polysiloxane compounds or alkylsilanes are also suitable as alternatives. These materials exhibit a particularly good adhesion on metals.

Among the amorphous fluoropolymers, amorphous modifications of Teflon are particularly suitable. This material can be obtained in suitable solvents and diluted to an optimum concentration prior to use. The solution can then be applied by means of a conventional application method such as spraying, wiping, brushing, dipping or printing onto the anti-corrosion layer, the solvent evaporated and the remaining material fixed on the anti-corrosion layer, if necessary by means of a heating step at an elevated temperature. After the solvent has evaporated, an extremely thin Teflon film remains which in particular covers the inner surfaces of the pores.

The contact device according to the invention is particularly advantageously suitable for picking off the current generated by a fuel cell stack.

In addition, it can be advantageously used in the case of a fuel cell block comprising a plurality of fuel cell stacks to provide the electrical connection between at least two of the fuel cell stacks.

The invention and further advantageous embodiments of the invention according to features described in the dependent claims are described in detail in the following with reference to an embodiment realized schematically in the figures.

DETAILED DESCRIPTION OF INVENTION

Figure 1:
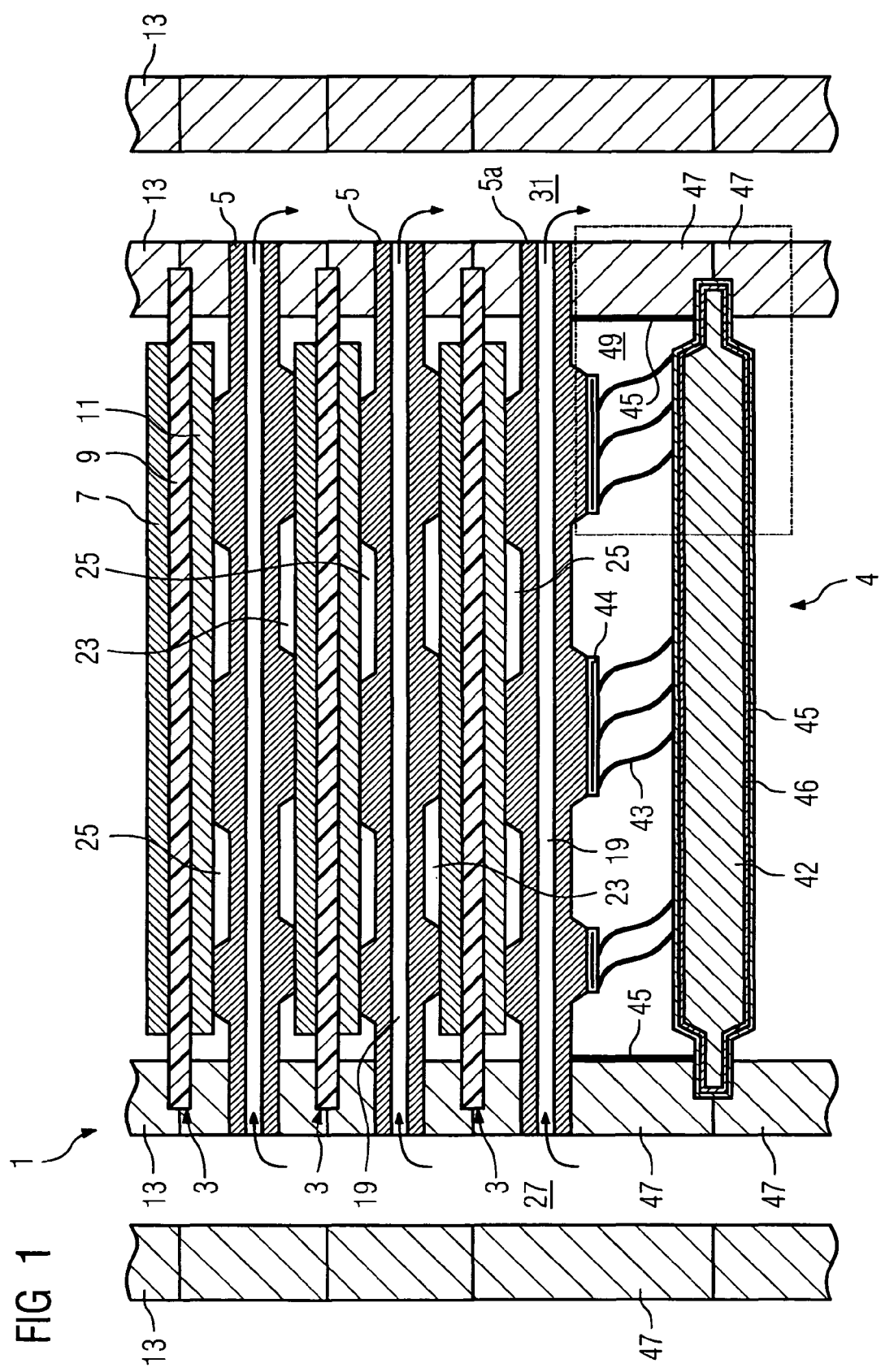
FIG. 1 shows a cross-section through a fuel cell stack having a contact device according to the invention.

A fuel cell stack 1 illustrated in FIG. 1 comprises a plurality of membrane electrode units 3 and bipolar plates 5 stacked alternately on one another and is terminated by a bipolar plate 5a. In this situation, a membrane electrode unit 3 comprises an anode 7, a membrane 9 and a cathode 11 in each case. The membrane electrode units 3 and the bipolar plates 5, 5a are mounted in seals 13.

When the fuel cell stack 1 is operating, moistened hydrogen flows into the anode gas chambers 23 which are located between the anode 7 of a membrane electrode unit 3 and an adjacent bipolar plate 5 in each case. In addition, oxygen moistened with water flows into the cathode gas chambers 25 which are located between the cathode 11 of a membrane electrode unit 3 and an adjacent bipolar plate 5 in each case. In the case of the terminating bipolar plate 5a, moistened oxygen flows only through the cathode gas chambers 25. The side of the bipolar plate 5a facing away from the cathode gas chambers 25 adjoins a terminal compartment 49 which is free of the fuel gases hydrogen and oxygen.

In order to remove the heat of reaction while the fuel cell stack 1 is operating cooling water flows from an axial channel 27 into the hollow spaces 19 of the bipolar plates 5 and 5a. The heat of reaction flowing in through the bipolar plates 5 and 5a into their hollow spaces 19 is absorbed by the cooling water which continues its passage by flowing into a further axial channel 31 and from there is discharged from the fuel cell stack 1.

The current generated by the fuel cell stack 1 is picked off with the aid of a contact device 4 which terminates the terminal compartment 49 and electrically contacts the terminating bipolar plate 5a. The contact device 4 comprises a contact plate 42 which is in electrical contact by way of contact springs 43 and a contact membrane 44 with the bipolar plate 5a. In order to ensure a particularly good level of conductivity, copper or a copper alloy is the base material used for the components 42, 43, 44. The contact springs 43 serve to compensate for tolerances between the contact plate 42 and the fuel cell stack 1, the contact membrane 44 results in a particularly low contact resistance between the bipolar plate 5a and the contact springs 43.

Figure 2:
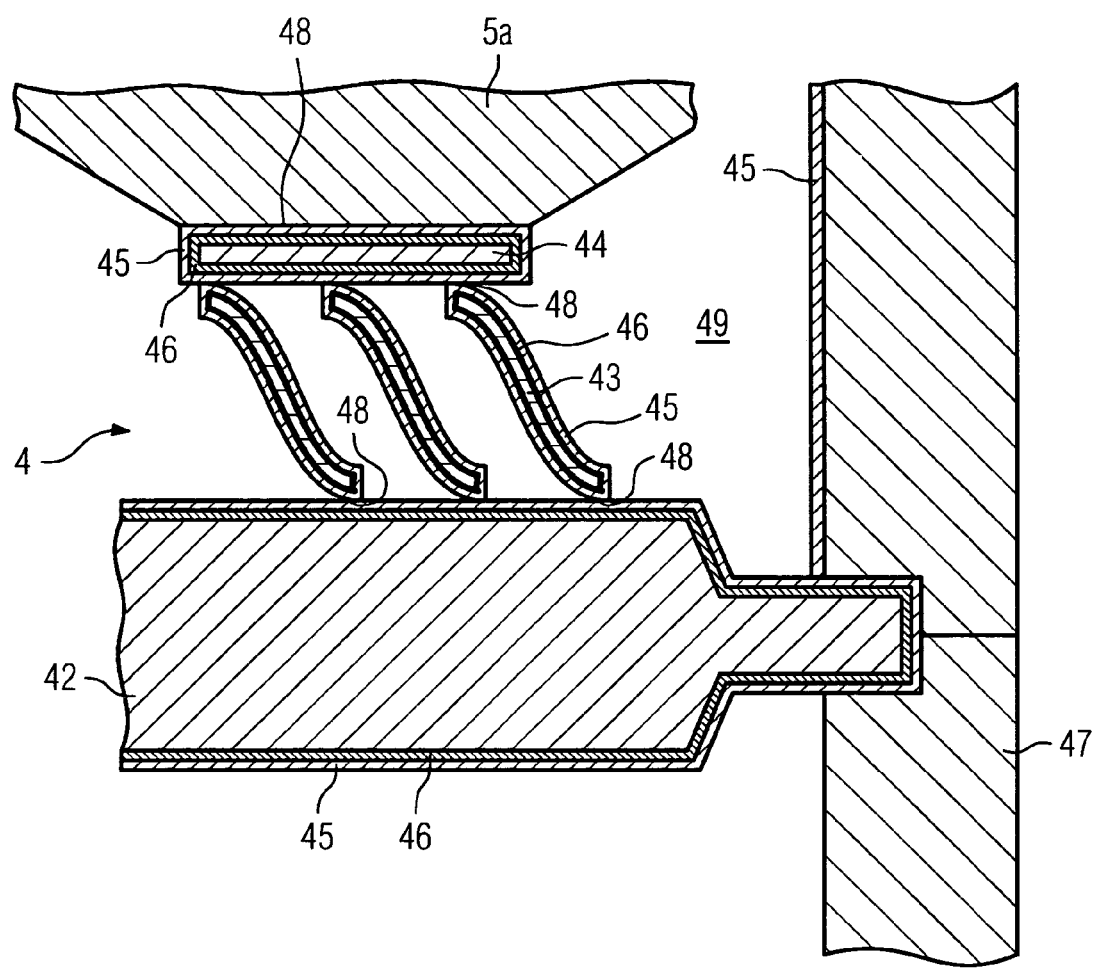
FIG. 2 shows a part of the contact device from FIG. 1 in an enlarged representation.

As can be seen in detail in FIG. 2, the contact plate 42, the contact springs 43 and the contact membrane 44 are provided with a hydrophobic surface layer 45 on their surface. A particularly low contact resistance between the hydrophobic surface layer 45 and the base material of the contact plate 42, the contact springs 43 and the contact membrane 44 is achieved by the fact that a highly conductive contact layer 46 consisting of one or more noble metals, gold and nickel in particular, is additionally provided between the base material and the hydrophobic surface layer 45.

The contact device 4 also comprises retaining elements 47 made of an elastomer for holding and aligning the contact device 4 to the fuel cell stack 1, which also serve to seal the terminal compartment 49 with respect to the axial channel 27 or 31. As a result of use of the elastomer material, compensation for tolerances in the fuel cell stack 1 is also possible. The retaining elements 47 are likewise partially provided with a hydrophobic surface layer 45.

The pores present on the surface of the contact device 4 or the contact plate 42, the contact springs 43, the contact membrane 44 and the retaining elements 47 are closed by means of the hydrophobic surface layer 45. If water occurs on the surface of the contact device then droplets will be formed, whereby the droplets exhibit only a low adhesion on the surface and can be removed from the terminal compartment 49 and thus from the fuel cell stack 1 by means of only a small gas flow.

The hydrophobic surface layer consists preferably of an amorphous modification of Teflon (for example an amorphous copolymer comprising 65-99 mol % of perfluoro-2,2-dimethyl-1,3-dioxol with a complementary quantity of tetrafluoroethylene, obtainable from DuPont Fluoroproducts under the product name Teflon®AF). As a result of its good solubility in solvents this material can be applied thinly to the components 42, 43, 44 of the contact device 4 and is thus particularly suitable for the electrical contact points 48 both between the individual components 42, 43, 44 of the contact device 4 and also from the contact device 4 to the bipolar plate 5a.

In order to enable a good current flow in the area of the electrical contact points 48 between the contact plate 42, the contact springs 43, the contact membrane 44 and the adjoining bipolar plate 5 and simultaneously enable the simple removal of water from the terminal compartment 49 the thickness of the hydrophobic surface layer 45 consisting of amorphous Teflon at these connection points 48 is set to an optimum between a low contact resistance and a high hydrophobicity. This is made possible in particular by the fact that the hydrophobic surface layer 45 at these electrical connection points 48 has a thickness in the region of 0.1 nm to 10 nm, 0.5 nm to 0.7 nm in particular. In this context a dilution of the amorphous Teflon with a solvent in the ratio 1:200 has proved to be suitable. The thin layer on the contact membrane 44 achieved by this means can for example can be mechanically shifted to the side by the contact springs 43. The Teflon then remains in the pores and brings about the desired hydrophobicity while the contact points on the contact membrane 44 are free from Teflon and thus exhibit only a low contact resistance.

In the area outside the electrical contact points 48, for example on the elastomer retaining elements 47, the amorphous Teflon can be applied undiluted. The thickness of the hydrophobic layer there is advantageously 0.01 µm to 100 µm, 0.01 µm to 1 µm in particular.

The invention claimed is:

1. A contact device for electrically contacting a fuel cell stack, comprising:
    a contact plate and contact springs,
        wherein the contact plate is in electrical contact via the contact springs with a pole plate or a bipolar plate of the fuel cell stack, and
        wherein the contact plate and the contact springs are provided at least partially on their surfaces with a hydrophobic surface layer.
2. The contact device according to claim 1, wherein the contact device comprises retaining elements for holding and/or aligning the contact device against a fuel cell stack, wherein the retaining elements are provided at least partially with the hydrophobic surface layer.
3. The contact device according to claim 2, wherein the retaining elements comprise an elastomer.
4. The contact device according to claim 1, wherein the thickness of the hydrophobic surface layer in the area of electrical contact points is set to an optimum between a low electrical contact resistance and a high hydrophobicity.
5. The contact device according to claim 1, wherein the hydrophobic surface layer contains polytetrafluoroethylene.
6. The contact device according to claim 5, wherein the hydrophobic surface layer at electrical contact points comprises a PTFE/metal or PTFE/carbon mixture.
7. The contact device according to claim 1, wherein the hydrophobic surface layer comprises a hydrophobic material which is soluble in a solvent.
8. The contact device according to claim 7, wherein the hydrophobic material comprises an amorphous fluoropolymer.
9. The contact device according to claim 8, wherein the hydrophobic material consists entirely or partially of an amorphous fluoropolymer.
10. The contact device according to claim 8, wherein the amorphous fluoropolymer is an amorphous modification of Teflon.
11. The contact device according to claim 7, wherein the hydrophobic material comprises a polysiloxane compound or alkylsilanes.
12. The contact device according to claim 11, wherein the hydrophobic material consists entirely or partially of a polysiloxane compound or of alkylsilanes.
13. The contact device according to claim 7, wherein a thickness of the hydrophobic layer in an area of an electrical connection point is in a range from 0.1 nm to 10 nm.
14. The contact device according to claim 13, wherein the thickness of the hydrophobic layer in the area of an electrical connection point is in a range from 0.5 nm to 0.7 nm.
15. The contact device according to claim 8, wherein a thickness of the hydrophobic surface layer outside an area of an electrical connection point is in a range from 0.01 µm to 100 µm.
16. The contact device according to claim 15, wherein the thickness of the hydrophobic surface layer outside the area of an electrical connection point is in a range from 0.01 µm to 1 µm.
17. The contact device according to claim 1, wherein the contact device uses copper or a copper alloy as its base material.
18. The contact device according to claim 17, further comprising a highly conductive contact layer comprising one or more noble metals, wherein the highly conductive contact layer is arranged between the base material and the hydrophobic surface layer.
19. The contact device according to claim 18, wherein the one or more noble metals are gold and/or nickel.
20. A fuel cell stack comprising:
    a contact device for picking off a current generated by the fuel cell stack,
    wherein the contact device comprises
        a contact plate and contact springs,
            wherein the contact plate is in electrical contact via the contact springs with a pole plate or a bipolar plate of the fuel cell stack, and
            wherein the contact plate and the contact springs are provided at least partially on their surfaces with a hydrophobic surface layer.
21. A fuel cell block comprising:
    a plurality of fuel cell stacks; and
    a contact device for an electrical connection of at least two of the fuel cell stacks,
    wherein the contact device comprises
        a contact plate and contact springs,
            wherein the contact plate is in electrical contact via the contact springs with a pole plate or a bipolar late of the fuel cell stack and
            wherein the contact plate and the contact springs are provided at least partially on their surfaces with a hydrophobic surface layer.

* * * * *